US007540191B2

(12) United States Patent
Hashimoto et al.

(10) Patent No.: US 7,540,191 B2
(45) Date of Patent: Jun. 2, 2009

(54) ANGULAR RATE SENSOR AND METHOD OF MANUFACTURING THE SAME

(75) Inventors: Katsumi Hashimoto, Tokyo-To (JP); Jiro Takei, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 38 days.

(21) Appl. No.: 11/442,306

(22) Filed: May 30, 2006

(65) Prior Publication Data
US 2006/0266862 A1 Nov. 30, 2006

(30) Foreign Application Priority Data
May 27, 2005 (JP) ............................. 2005-156228

(51) Int. Cl.
*G01P 15/10* (2006.01)
(52) U.S. Cl. .................... 73/514.29; 257/415; 257/416; 257/417; 257/418; 257/419
(58) Field of Classification Search ............... 73/514.29
See application file for complete search history.

(56) References Cited
U.S. PATENT DOCUMENTS 5,233,213 A * 8/1993 Marek ........................ 257/415
6,400,009 B1 * 6/2002 Bishop et al. ............... 257/704
2005/0253283 A1 * 11/2005 DCamp et al. .............. 257/787

FOREIGN PATENT DOCUMENTS

JP    A-2002-350138    12/2002

* cited by examiner

*Primary Examiner*—Jerome Jackson, Jr.
*Assistant Examiner*—Jose R Diaz
(74) *Attorney, Agent, or Firm*—Oliff & Berridge, PLC

(57) ABSTRACT

An angular rate sensor 100 comprises a first structure 110 which includes a fixed portion 111 having an opening 114, a displacing portion 112 placed in the opening 114, and a connecting portion 113 adapted to connect the fixed portion 111 and the displacing portions 112; a second structure 130 which includes a weighting portion 132 joined to the displacing portion 112, and a pedestal portion 131 arranged to surround the weighting portions 132 and joined to the fixed portion 111, and is laminated in place on the first structure 110. A first body 140 formed by laminating a first metal layer 142 and a first insulating layer 141 thereon is joined to the fixed portion 111 such that the first insulating layer 141 faces the fixed portion 111. A second substrate 150 formed by laminating a second metal layer 152 and a second insulating layer 151 thereon is joined to the pedestal portion 131 such that the second insulating layer 151 faces the pedestal portion 131.

8 Claims, 13 Drawing Sheets

ANGULAR RATE SENSOR AND METHOD OF MANUFACTURING THE SAME

BACKGROUND OF THE INVENTION

1. Field of the Invention

The present invention relates to an angular rate sensor for detecting angular rate and a method of manufacturing the sensor.

This application is based on the prior Japanese Patent Application No. 2005-156228 filed on May 27, 2005, the entire contents of which are incorporated herein by reference.

2. Background Art

The technology of angular rate sensors for detecting angular velocity by vibrating a vibrating portion and utilizing the Coriolis force based on the angular rate has been developed (Patent Document 1).

Patent Document 1: TOKUKAI No. 2002-350138, KOHO

In the aforementioned technology, a sealing means of the vibrating portion is not disclosed. It is preferred to reduce the influence of air resistance by sealing the vibrating portion, because the vibration portion is subjected to air resistance.

However, ensuring the credibility of the sealing and attempting miniaturization of the angular rate sensor is always associated with some difficulty. For example, when attempting to seal the angular rate sensor using a glass substrate, the thickness tends to become large in order to strengthen the sensor, and therefore it is difficult to miniaturize the angular rate sensor along the thickness direction.

SUMMARY OF THE INVENTION

In light of the above, it is an object of the present invention to provide an angular rate sensor that can provide credibility of sealing and miniaturization, and a method of manufacturing such an angular sensor.

The present invention is an angular rate sensor comprising: a first structure which includes a fixed portion having an opening, a displacing portion placed in the opening and configured to be displaced relative to the fixed portion, and a connecting portion adapted to connect the fixed portion and the displacing portions, and is formed of a substrate composed of a first semiconductor material; a second structure which includes a weighting portion respectively joined to the displacing portions, and a pedestal portion arranged to surround the weighting portion and joined to the fixed portion, and is laminated in place on the first structure and composed of a second semiconductor material; a first substrate laminated on the first structure; a second substrate laminated on the second structure; a vibration imparting portion adapted to impart vibration, in a direction vertical to the first structure, to the displacing portion of the first structure; and a displacement detecting portion adapted to detect displacement of the displacing portion; wherein the first substrate, the fixed portion, the pedestal portion, and the second substrate form a sealed body together such that the displacing portion and the weighting portion can be moved in the sealed body.

The present invention is an angular rate sensor, wherein the first structure includes a first metal layer and a first insulating layer laminated on the first metal layer, the first insulating layer being connected to the fixed potion; and the second structure includes a second metal layer and a second insulating layer laminated on the second metal layer, the second insulating layer being connected to the pedestal portion.

The present invention is an angular rate sensor, wherein each of the first insulating layer of the first substrate and the second insulating layer of the second substrate is composed of a material capable of being etched.

The present invention is an angular rate sensor, wherein either of the first insulating layer of the first substrate or the second insulating layer of the second substrate has a third metal layer formed thereon.

The present invention is an angular rate sensor, wherein each of the first semiconductor material of the first structure and the second semiconductor material of the second structure is formed from silicon.

The present invention is an angular rate sensor, wherein a joining portion is provided between the first structure and the second structure.

The present invention is an angular rate sensor, wherein each of the first semiconductor material of the first structure and the second semiconductor material of the second structure is formed from silicon while the joining portion is formed from silicon oxide.

The present invention is an angular rate sensor, wherein the vibration imparting portion is formed of the third metal layer.

The present invention is an angular rate sensor, wherein the displacement detecting portion is formed of the third metal layer.

The present invention is a method of manufacturing an angular rate sensor comprising the steps of: producing a semiconductor substrate by laminating a first layer composed of a first semiconductor material, a second layer composed of an oxide, and a third layer composed of a second semiconductor material, in succession; etching the first and third layers of the semiconductor substrate to produce, from the first layer, a first structure which includes a fixed portion having an opening, a displacing portion placed in the opening and adapted to be displaced relative to the fixed portion, and a connecting portion adapted to connect the fixed portion and the displacing portions, and produce, from the third layer, a second structure which includes weighting portions and a pedestal portion arranged to surround the weighting portions, and is laminated in place on the first structure; etching the second layer of the semiconductor substrate, in which the first and second structures have been produced, to produce a joining portion including a first joining portion having an opening and adapted to join the fixed portion to the pedestal portion, and a second joining portion arranged in the opening of the first joining portion and adapted to join the displacing portions to the weighting portion; and joining a first substrate to the first structure and joining the second substrate to the second structure, by lamination, respectively.

The present invention is a method of manufacturing an angular rate sensor, wherein the first structure includes a first metal layer and a first insulating layer laminated on the first metal layer; and the second structure includes a second metal layer and a second insulating layer laminated on the second metal layer; and wherein the first insulating layer of the first substrate is laminated on the first structure, and the second insulating layer of the second substrate is laminated on the second structure.

The present invention is a method of manufacturing an angular rate sensor further comprising the steps of: attaching an adhesive film either on the first or second substrate; cutting an angular rate sensor from the semiconductor substrate and the first and second substrates corresponding to a region where the first and second structures are formed; pressing the adhesive film corresponding to the region to push out the cut angular rate sensor; and sucking the pushed out angular rate sensor.

The present invention is a method of manufacturing an angular rate sensor, wherein a vibration imparting portion adapted to imparting vibration, in a direction vertical to the first structure, to the displacing portion of the first structure is provided at the same time of laminating the first substrate on the first structure and laminating the second substrate on the second structure.

The present invention is a method of manufacturing an angular rate sensor, wherein either of the first insulating layer of the first substrate or the second insulating layer of the second substrate has a third metal layer formed thereon; and the vibration imparting portion adapted to impart vibration, in a direction vertical to the first structure, to the displacing portions of the first structure is formed of the third metal layer.

The present invention is a method of manufacturing an angular rate sensor, wherein either of the first insulating layer of the first substrate or the second insulating layer of the second substrate has a third metal layer formed thereon; and a displacement detecting portion adapted to detect displacement of the displacing portions is formed of the third metal layer.

Thus, according to the present invention, an angular rate sensor that can provide the credibility of sealing and miniaturization, and a method of manufacturing such an angular sensor can be provided.

DETAILED DESCRIPTION OF THE INVENTION

An embodiment according to the present invention will be described in detail with reference to the drawings.

Figure 1:
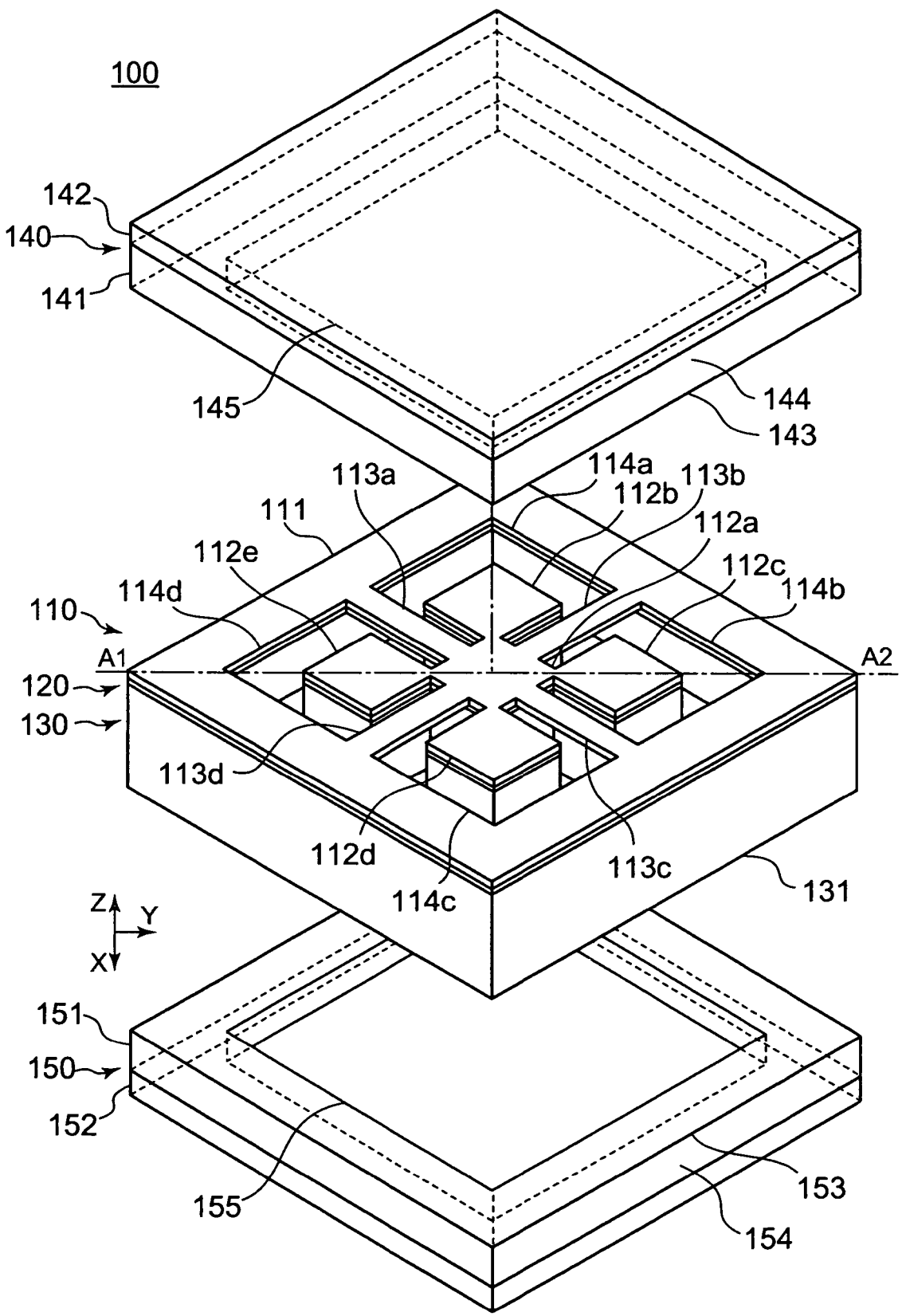
FIG. 1 is an exploded perspective view of an angular rate sensor according to a first embodiment of the present invention.

FIG. 1 is an exploded perspective view showing a state where an angular rate sensor 100 is disassembled.

The angular rate sensor 100 comprises a first structure 110, a joining portion 120, a second structure 130, a first substrate 140, and a second substrate 150, which are laminated in place with one another.

Figure 2:
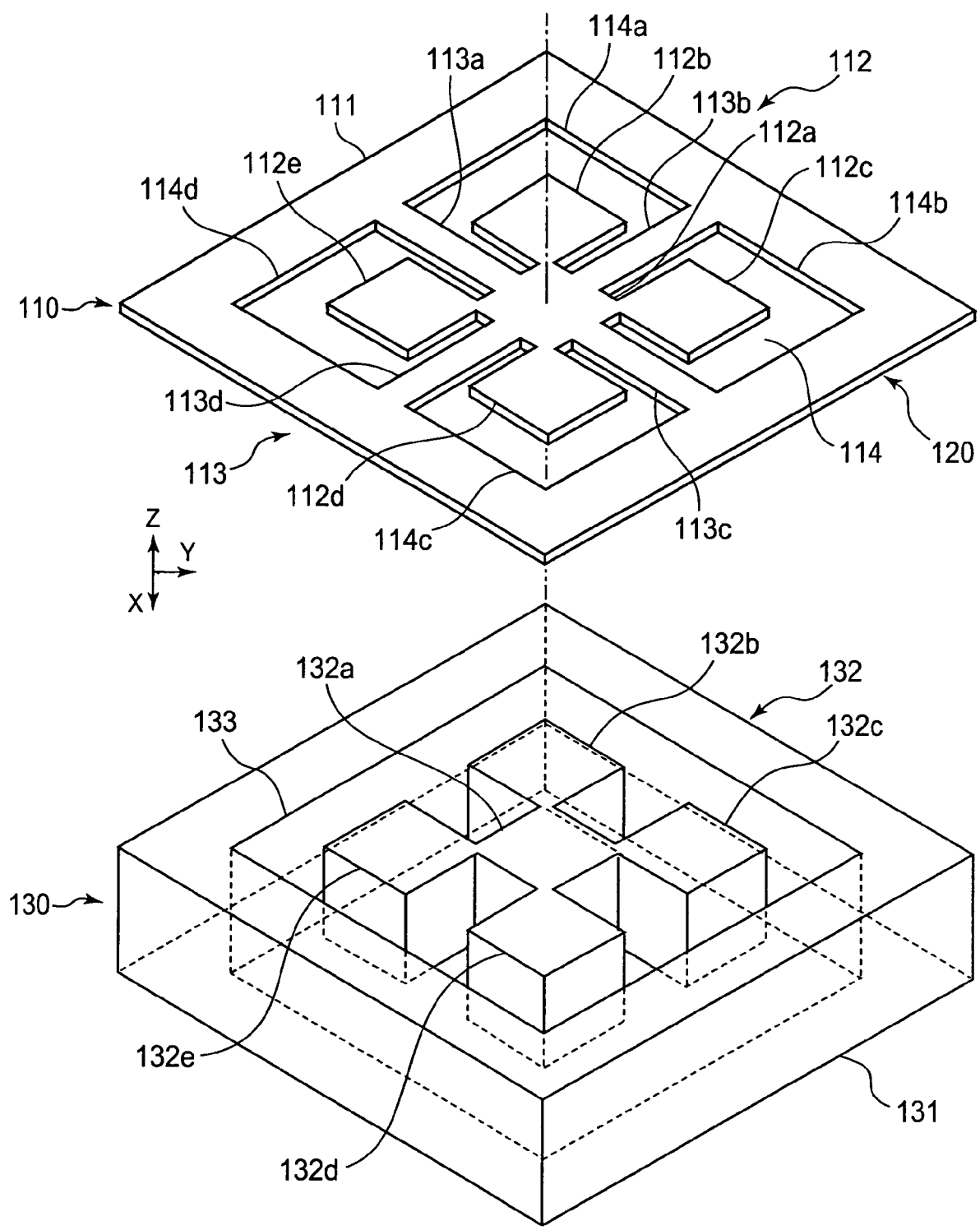
FIG. 2 is an exploded perspective view showing a state where a part of the angular rate sensor of FIG. 1 is disassembled.
Figure 3:
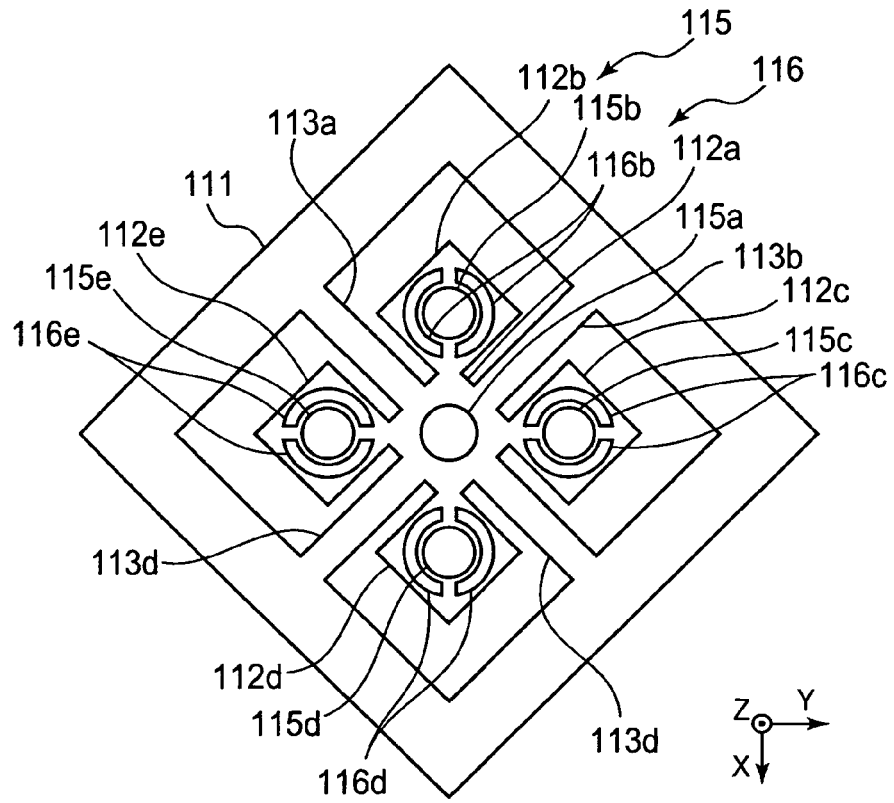
FIG. 3 is a top view of a first structure.
Figure 4:
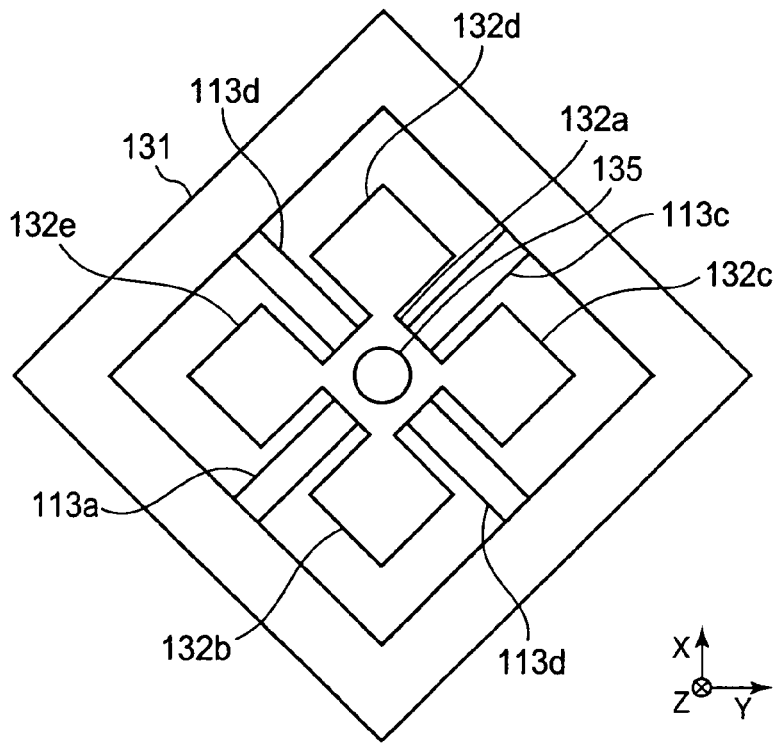
FIG. 4 is a bottom view of a second structure.
Figure 5:
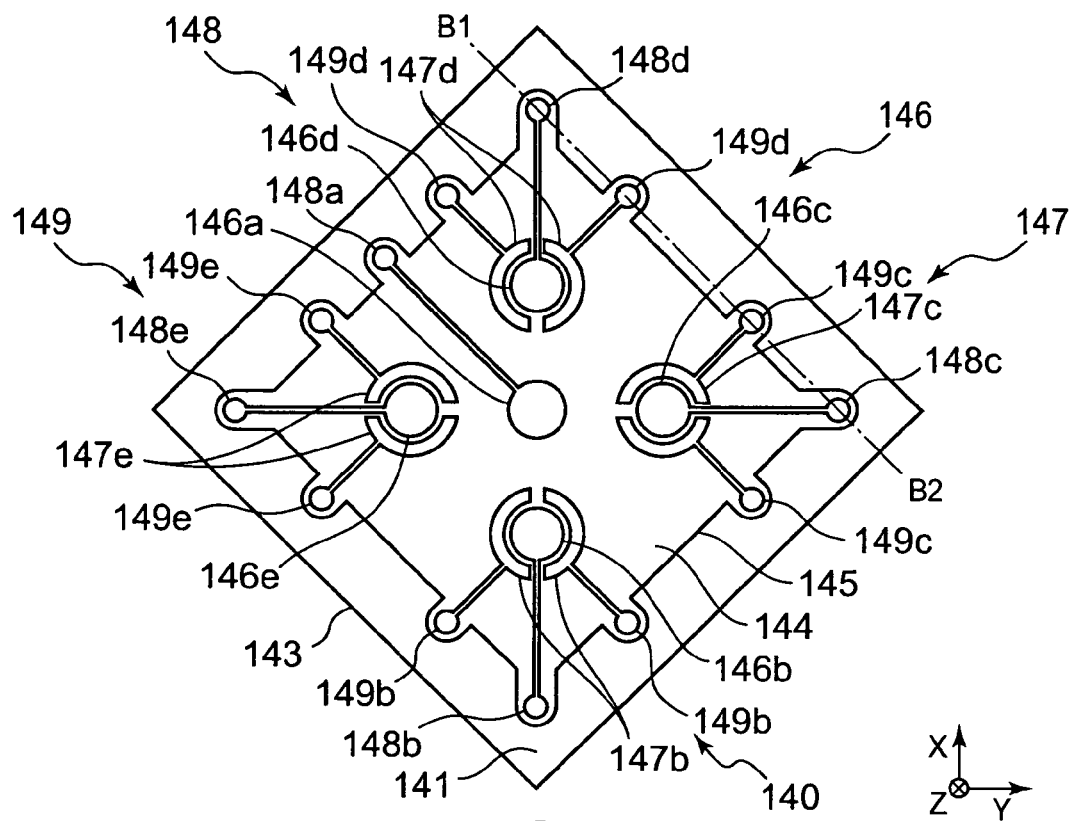
FIG. 5 is a bottom view of a first substrate.
Figure 6:
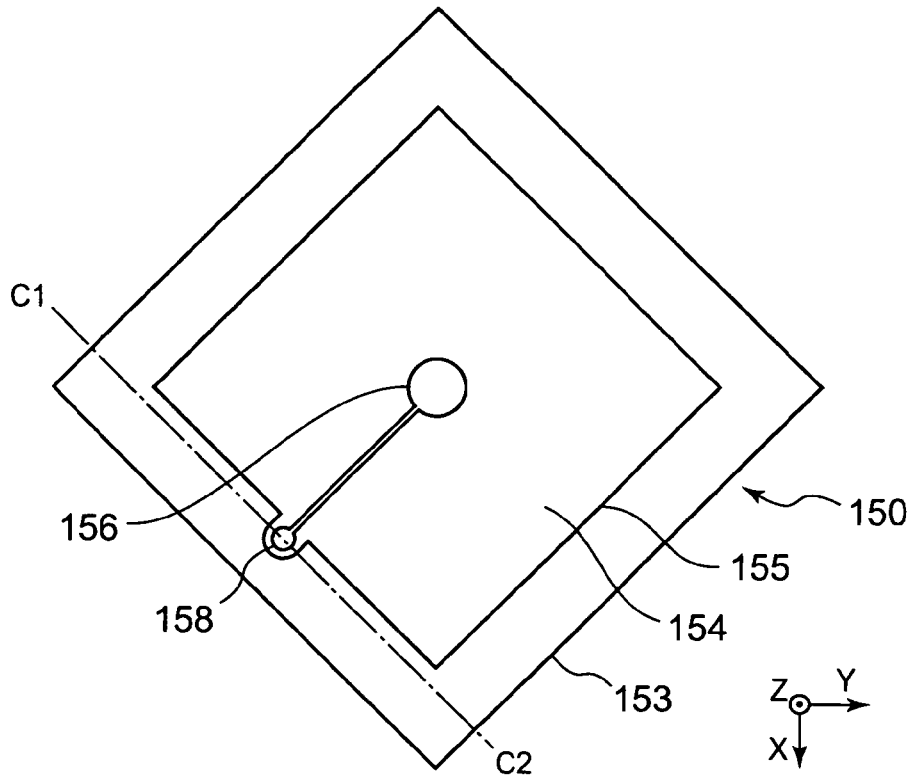
FIG. 6 is a top view of a second substrate.
Figure 7:
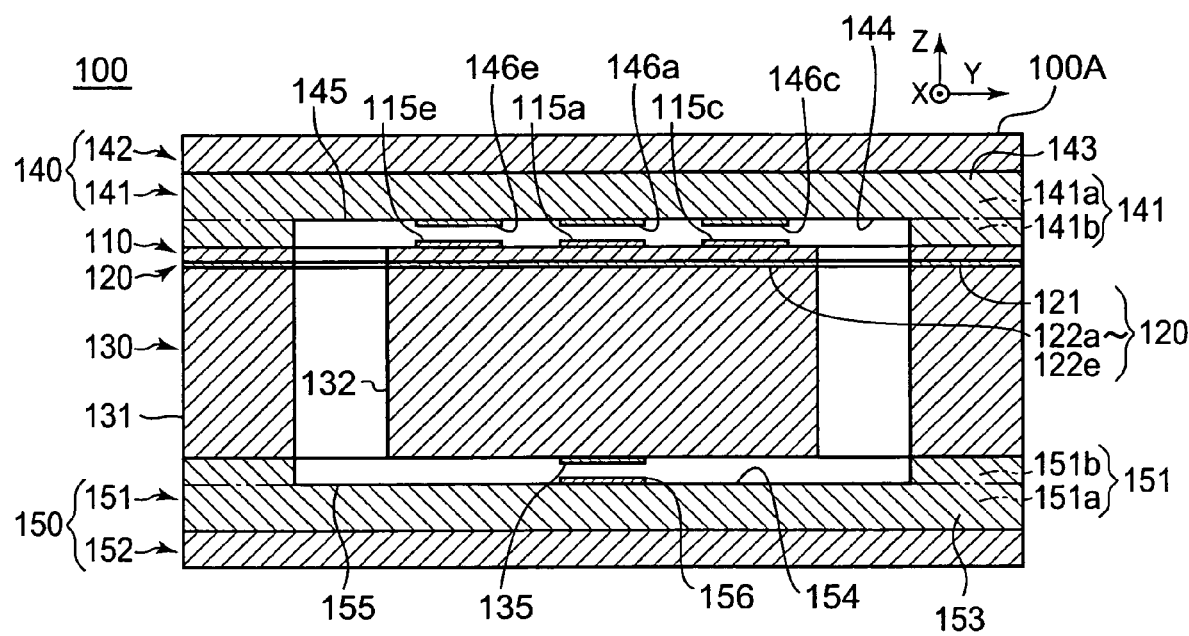
FIG. 7 is a cross section of an angular rate sensor.
Figure 8:
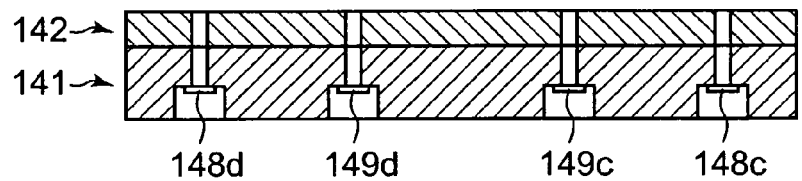
FIG. 8 is a cross section of the first substrate.
Figure 9:
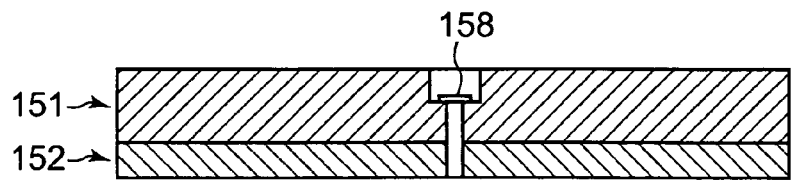
FIG. 9 is a cross section of the second substrate.

FIG. 2 is an exploded perspective view showing a state where a portion (the first structure 110 and the second structure 130) of the angular rate sensor 100 is further disassembled. FIG. 3 is a top view of the first structure 110, and FIG. 4 is a bottom view of the second structure 130. FIG. 5 is a bottom view of the first substrate 140, and FIG. 6 is a top view of the second substrate 150. FIG. 7 is a cross section showing a state where the angular rate sensor 100 is cut along line A1-A2 of FIG. 1. FIGS. 8 and 9 are cross sections showing states where the first and second substrates 140, 150 are cut along line B1-B2 of FIG. 5 and line C1-C2 of FIG. 6, respectively.

It is noted that in FIGS. 1 and 2 the depiction of electrodes which will be described below is omitted for clearness.

The angular rate sensor 100 is sealed and has a reduced pressure in the interior. This is because such a reduced pressure serves to decrease air resistance upon vibration of displacing portions (vibrating portion) 112 which will be described below. Upon vibration of the displacing portions 112 in the Z-axis direction, Coriolis Force Fy, Fx in the Y-axis or X-axis direction due to angular velocity (angular rate) ωx, ωy in the X-axis or Y-axis direction will be applied to the displacing portions 112. Thus, by detecting of displacement of the displacing portions 112 due to the Coriolis Force Fy, Fx applied thereto, it is possible to measure the angular velocity (angular rate) ωx, ωy. In this way, the angular rate sensor 100 can measure these two-axis angular velocities ωx, ωy. This will be described below in more detail.

Each of the first structure 110, joining portion 120, second structure 130, first substrate 140, and second substrate 150 has an outer periphery of, for example, a generally square shape having each side of 1 mm, and they have heights of 3 to 12 μm, 0.5 to 3 μm, 600 to 725 μm, 30 to 150 μm, and 30 to 150 μm, respectively.

The first structure 110, joining portion 120, and second structure 130 are formed from silicon, silicon oxide, and silicon, respectively, thus being produced integrally using an SOI (Silicon On Insulator) substrate having a silicon/silicon oxide/silicon three-layered structure. The first substrate 140 and the second substrate 150 are made of laminated products formed of a resinous material and a metal, respectively.

The first structure 110 is formed of a substrate having a contour of a generally square shape, and includes a fixed portion 111, displacing portions 112 (112a to 112e), and connecting portions 113 (113a to 113d). The first structure 110 is made by etching a film of a semiconductor material to form openings 114 (114a to 114d).

The fixed portion 111 is formed of a substrate having an outer periphery and an inner periphery (opening) both having a generally square frame-like shape.

The displacing portions 112 comprise displacing portions 112a to 112e. The displacing portion 112a is a substrate having a generally square-shaped outer periphery, and is located around the center of the openings 114a of the fixed portion 111. The other displacing portions 112b to 112e are also formed, respectively, of substrates each having a generally square-shaped outer periphery, and arranged such that they are connected with and surround the displacing portion 112a on all sides (in the positive X-axis, negative X-axis, positive Y-axis, and negative Y-axis directions). The displacing portions 112a to 112e are joined, respectively, via the joining portion 120 to weighting portions 132a to 132e which will be described below, and displaced integrally relative to the fixed portion 111.

On the displacing portions 112a to 112e, driving electrodes 115 (115a to 115e) and detecting electrodes 116 (116b to 116e) are disposed, respectively. Though not shown, the driving electrodes 115 and the detecting electrodes 116 are connected with terminals provided on the fixed portion 111 via wires running through the connecting portions 113, respectively.

Each of the driving electrodes 115 is in a capacitive coupling relation to the corresponding one of driving electrodes 146 provided on a rear face of the first substrate 140, which electrodes 146 will be described below. The voltage to be applied during the capacitive coupling will cause vibration of the displacing portions 112 in the Z-axis direction. Also, each of the detecting electrodes 116 is in a capacitive coupling relation to the corresponding one of detecting electrodes 147 provided on a rear face of the first substrate 140, which electrodes 147 will be described below. Using the change in capacitance during the capacitive coupling, the displacements in the X-axis and Y-axis directions of the displacing portions 112 are detected. The driving operation and detection will be further described below.

The connecting portions 113a to 113d are substrates each having a generally rectangular shape, and adapted to connect the fixed portion 111 and the displacing portions 112 on all sides (in the directions of 45°, 135°, 225° and 315°, assuming that the X-axis direction is 0° in the X-Y plane), repespectively.

Each of the connecting portions 113a to 113d functions as a bendable beam. Such bending of the connecting portions 113a to 113d enables the respective displacing portions 112 to be displaced relative to the fixed portion 111. Specifically, the displacing portions 112 are linearly displaced in the positive Z-axis and negative Z-axis directions relative to the fixed portion 111, respectively. Also, the displacing portions 112 can effect both positive and negative rotations about both of the X axis and the Y axis relative to the fixed portion 111. Namely, as used herein, the term "displacement" may include both movement and rotation (i.e., movement in the Z axis and rotations in the X and Y axes).

The second structure 130 is formed of a substrate having a contour of a generally square shape, and includes a pedestal portion 131 and the weighting portions 132 (132a to 132e). The second structure 130 is produced by making openings 133 through etching a substrate of a semiconductor material. The pedestal portion 131 and the weighting portions 132 are of an approximately equal height, separated from each other by the openings 133, and movable relatively.

The pedestal portion 131 is formed of a substrate having an outer periphery and an inner periphery (opening) both having a generally square frame-like shape. The pedestal portion 131 has a shape corresponding to the fixed portion 111, and is connected to the fixed portion 111 via the joining portion 120.

Each of the weighting portions 132 has a mass suitable for serving as a weight or working body to receive Coriolis force due to angular velocity. That is, when angular velocity is applied, Coriolis force will work on the center of gravity of the weighting portions 132.

The weighting portions 132 are divided into weighting portions 132a to 132e each having a generally rectangular shape. The surrounding weighting portions 132b to 132e are connected to the centrally placed weighting portion 132a on all sides, enabling integral displacement (movement and rotation) as the whole body. Namely, the weighting portion 132a functions as a connecting portion for connecting the weighting portions 132b to 132e.

Each of the weighting portions 132a to 132e has a generally square cross section corresponding to each of the displacing portions 112a to 112e, and is joined to each of the corresponding displacing portions 112a to 112e via the joining portion 120. The displacing portions 112 are displaced corresponding to the Coriolis force to be applied to the weighting portions 132, thus enabling measurement of the angular velocity.

The aim of constructing the weighting portions 132 consisting of the weighting portions 132a to 132e is to achieve compatibility of miniaturization and sensitization of the angular rate sensor 100. That is, the miniaturization of the angular rate sensor 100 can lead to reduction of the volume of the weighting portions 132, thus decreasing their mass. Therefore, this may lower the sensitivity to the angular velocity. According to the present invention, dispersed arrangement of the weighting portions 132b to 132e without affecting the bending properties of the connecting portions 113a to 113d serves advantageously to ensure to provide an adequate mass of the weighting portions 132. As a result, the compatibility of the miniaturization and sensitization of the angular rate sensor 100 can be realized.

On the rear face of the weighting portion 132a is provided a driving electrode 135. The driving electrode 135 is in a capacitive coupling relation to a driving electrode 156 provided on the top face of the second substrate 150. The electrode 156 will be described below. The voltage to be applied during the capacitive coupling will cause vibration of the displacing portions 112 in the Z-axis direction. The driving operation will be further described below.

The joining portion 120, as describe above, connects the first and second structures 110, 130. The joining portion 120 is divided into a first joining portion 121 for connecting the fixed portion 111 and the pedestal portion 131, and second joining portions 122 (122a to 122e) for connecting the displacing portions 112a to 112e and the weighting portions 132a to 132e, respectively. Other than these portions, the first and second structures 110, 130 have openings 114, 133 so as to enable the bending of the connecting portions 113a to 113d and the displacement of the weighting portions 132.

The joining portions 121, 122 can be constructed by etching a silicon oxide film.

The first substrate 140 has an outer periphery of a substantially rectangular shape and includes a substrate body 141 and a reinforcing portion 142. The substrate body 141 has a frame portion 143 and a bottom plate portion 144. The substrate body 141 is made by forming a recess 145 having a generally rectangular shape (for example, with a width and height of 800 μm and a depth of 10 μm) in the substrate.

The frame portion 143 is formed of a substrate having outer and inner peripheries each having a generally square frame-like shape. The frame portion 143 has a shape corresponding to the shape of the fixed portion 111, and is joined to the fixed portion 111 by various means (for example, adhesives or alloys).

The bottom portion 144 is formed of a substrate having an outer periphery of a generally square shape which is substantially the same as the shape of the frame portion 143.

Forming the recess 145 in the substrate 140 is aimed to ensure to provide a space required for displacement of the displacing portions 112. Alternatively, in place of forming the recess 145 in the substrate 140, or in addition to the recess 145, it is also possible to make the fixed portion 111 different in height or thickness from the displacing portions 112. For example, making the thickness of the displacing portions 112 smaller than that of the fixed portion 111 can ensure to provide the space in which the displacing portions 112 can be displaced.

The reinforcing portion 142 is formed of a substrate having an outer periphery of a generally square shape, and is joined to the substrate body 141 by various means (for example, adhesives). The reinforcing portion 142 serves to enhance mechanical strength of the first substrate 140 and reduce gas permeability of the first substrate 140.

For example, in the case where the main component of the substrate body 141 is a resinous material (for example, a polyimide material), the thickness of the substrate body 141 must be increased to an extent so as to ensure to impart adequate strength to the first substrate 140. In addition, permeation of an external gas through the first substrate 140 may degrade the degree of vacuum in the interior of the angular rate sensor 100.

To address such challenges, a material, for example, a metal having high strength and non-gas-permeable properties can be used as the material for constituting the reinforcing portion 142 so as to ensure with ease to impart sufficient strength and non-gas-permeability to the reinforcing portion 142. As a result, it becomes easy to reduce the thickness of the first substrate 140 (i.e., miniaturize the angular rate sensor 100) as well as to decrease the gas permeability (i.e., lengthen the life span of the angular rate sensor 100).

Driving electrodes 146 (146a to 146e) and detecting electrodes 147 (147b to 147e) are provided on the bottom plate portion 144 (on the rear face of the first substrate 140). To the driving electrodes 146 and detecting electrodes 147 are connected terminals 148, 149, respectively. A through-hole is formed in the bottom plate portion 144 and reinforcing portion 142 for enabling electric connection from the exterior of the angular rate sensor 100 to the terminals 148, 149.

Each of the driving electrodes 146a to 146e is in a capacitive coupling relation to the corresponding one of the driving electrodes 115a to 115e, and the voltage to be applied during the capacitive coupling will cause vibration of the displacing portions 112 in the Z-axis direction. Also, each of the detecting electrodes 147b to 147e is in a capacitive coupling relation to the corresponding one of detecting electrodes 116b to 116e. Using the change in capacitance during the capacitive coupling, the displacements in the X-axis and Y-axis directions of the displacing portions 112 are detected. The driving operation and detection will be further described below.

As the substrate body 141, a resinous material, for example, polyimide can be used. In this case, the recess 145 can be formed by wet-etching the polyimide substrate using an etching solution (for example, an alkali-amide type etching solution). Thereafter, the driving electrodes 146 and the detecting electrodes 147 are formed.

Alternatively, as the substrate body 141, a laminated material composed of a resin substrate (first insulating layer) (for example, polyimide) 141a and a metal substrate (second insulating layer) (for example, copper) 141b can be used. In such a case, by wet-etching the metal substrate 141b by an etching solution (for example, an aqueous $FeCl_3$ solution), the recess 145 can be produced. Further, the bottom face of the frame portion 143 will be formed of the metallic material. Also, the reinforcing portions 142 will be a first metal layer.

The metal substrate 141b can be also used as a material for constituting the driving electrodes 146 and detecting electrodes 147. In this case, the metal substrate 141b are etched in two steps. Namely, places shallowly etched in the metal substrate 141b are used as the driving electrodes 146 and detecting electrodes 147. Thereafter, other places in the metal substrate 141b are etched deeply, and places where the resin substrate 141a is exposed will be the bottom face of the recess 145.

As stated above, the recess 145 may not be formed in the substrate body 141 (for example, the height of the displacing portions 112 and connecting portions 113 is set lower than the fixed portion 111). In that case, it is not necessary to perform the two-step etching for processing the metal substrate 141b. The metal substrate 141b may be used as a material for constituting the places corresponding to the bottom face of the frame portion 143, the driving electrodes 146 and detecting electrodes 147.

As the reinforcing portion 142, a metal, for example, Fe—Ni type alloys, Fe—Ni—Co type alloys, more specifically stainless steel or Invar can be used.

For making the first substrate 140, a three-laminated (three-layered) material composed of the first metal substrate 142, the resin substrate 141a, and the second metal substrate 141b can be used. The three-layered material can be formed, for example, by providing an adhesive layer between the resin substrate 141a and the metal substrate 141b for laminating or adhering them together. Upon adhesion, optionally, pressurization using a press or heating may be employed.

In the case where the second metal substrate 141b is etched in two steps to form the driving electrodes 146 and detecting electrodes 147, the first metal substrate 142 will constitute the reinforcing portion 142. As described above, when the recess 145 is not formed, the driving electrodes 146 and detecting electrodes 147 are formed by etching the second metal substrate (the places corresponding to the bottom face of the frame portion 143 are also made of the second metal substrate).

In place of the three-layered material, a two-layered material composed of the metal substrate 142 and resin substrate 141 may be also used. In such a case, the recess 145 will be formed by etching the resin substrate 141, followed by providing addition of the driving electrodes 146 and detecting electrodes 147. Also, the metal substrate 142 will constitute the reinforcing portion 142.

By using a layered material of the resin substrate 141 and metal substrate 142 as the first substrate 140, as compared to the case in which only a glass material is used for example, the height of the substrate 140 can be further reduced and thus a thinner type angular rate sensor 100 can be accomplished. Specifically, the height (thickness) of the substrate 140 can be set to approximately 60 to 90 μm (resinous material: 20 μm+metallic material: 40 to 70 μm), as compared to 600 μm in the case of a substrate made of glass material. This is because the metallic materials have much better resistance against breakage than the glass materials.

The first substrate 140 and the first structure 110 can be connected together using an adhesive or alloy.

For example, after providing a gold (Au) layer on the first structure 110 while providing a tin (Sn) layer on the first substrate 140, the two components are heated while being contacted with each other. As a result, the gold and the tin will be changed into an alloy (gold-tin eutectic alloy) to form an alloyed joined layer, thus the first substrate 140 and the first structure 110 are joined together.

It is preferred that a barrier layer comprising Ni, Ti, Cr or the like is further provided between the first structure 110 and the gold layer. Consequently, it can be prevented for the gold to diffuse into the first structure 110 resulting in degradation of the properties of the angular rate sensor 100. The barrier layer may also serves as an adhesive for adhering the gold layer to the first structure 110 for forming the gold layer on the first structure 110 (because of poor reactivity of gold, the bond strength of gold, for example, to silicon is quite low).

The second substrate 150 has an outer periphery of a substantially rectangular shape and includes a substrate body 151 and a reinforcing portion 152. The substrate body 151 has a frame portion 153 and a bottom plate portion 154. The substrate body 151 can be made by forming a recess 155 having a generally rectangular shape (for example, having a width and height of 800 μm and a depth of 10 μm) in the substrate.

The frame portion 153 is formed of a substrate having outer and inner peripheries each having a generally square frame-like shape. The frame portion 153 has a shape corresponding to the shape of the pedestal portion 131, and is joined to the pedestal portion 131 by various means (for example, adhesives or alloys).

The bottom plate portion 154 is formed of a substrate having an outer periphery with a generally square shape.

The aim of forming the recess 155 in the substrate 150 is to ensure to provide a space required for the displacement of the weighting portions 132. Alternatively, in place of forming the recess 155 in the second substrate 150, or in addition to the recess 155, it is also possible to make the pedestal portion 131 with a different height or thickness from that of the weighting portions 132. For example, making the thickness of the weighting portions 132 smaller than that of the pedestal portion 131 can ensure to provide the space in which the weighting portions 132 can be displaced.

The reinforcing portion 152 is formed of a substrate having an outer periphery of a generally square shape, and is joined to the substrate body 151 by various means (for example, adhesives). The reinforcing portion 152 serves to enhance mechanical strength of the second substrate 150 and reduce gas permeability of the second substrate 150.

For example, in the case where the main component of the substrate body 151 is a resinous material (for example, a polyimide material), the thickness of the second substrate 150 must be increased to an extent so as to ensure to provide adequate strength of the substrate. In addition, permeation of an external gas through the second substrate 150 may degrade the degree of vacuum in the interior of the angular rate sensor 100.

To address such challenges, a material, for example, a metal having high strength and non-gas-permeable properties can be used as the material for constituting the reinforcing portion 152 so as to ensure with ease to impart sufficient strength and non-gas-permeability to the reinforcing portion 152. As a result, it becomes easy to reduce the thickness of the second substrate 150 (i.e., miniaturize the angular rate sensor 100) as well as to decrease the gas permeability (i.e., lengthen the life span of the angular rate sensor 100).

A driving electrode 156 is provided on the bottom plate portion 154 (on the top face of the second substrate 150). A terminal 158 is connected to the driving electrode 156. A through-hole is formed in the bottom plate portion 154 and reinforcing portion 152 for enabling electric connection from the exterior of the angular rate sensor 100 to the terminal 158.

The driving electrode 156 is in a capacitive coupling relation to the driving electrode 135, and the voltage to be applied during the capacitive coupling will cause vibration of the displacing portions 112 in the Z-axis direction. The details of this driving operation will be described below. Since the second substrate 150 has a similar structure to the first substrate 140, the same material for constituting the first substrate can also be used for the second substrate 150. Specifically, a three-laminated (three-layered) material composed of the first metal substrate 152, the resin substrate 151$a$, and the second metal substrate 151$b$ (or a two-layered material composed of the metal substrate 152 and resin substrate 151) can be used. In this respect, since the second substrate 150 is not essentially different from the first substrate 140, the description of this matter is omitted here.

By using a layered material of the resinous material 151 and metallic material 152 as the second substrate 150, as compared to the case in which only a glass material is used for example, the height of the substrate 150 can be further reduced and thus a thinner type angular rate sensor 100 can be accomplished. Specifically, the height (thickness) of the substrate 150 can be set to approximately 60 to 90 μm (resinous material: 20 μm+metallic material: 40 to 70 μm), as compared to 600 μm in the case of glass materials. This is because the metallic materials have much better resistance against breakage than the glass materials.

As will be described below, when the produced angular rate sensor 100 is taken out from a semiconductor substrate by dicing, it is possible to press any suitable position of the bottom face of the substrate 150. This facilitates handling during production.

The first substrate 140 and the first structure 110 are connected together using an adhesive or alloy.

In this respect, since the second substrate 150 is not essentially different from the first substrate 140, details of this matter is omitted here.

A sealed body 100A is constructed by the first substrate 140, fixed portion 111 of the first structure 110, pedestal portion 131 of the second structure 130, and second substrate 150, and as such the displacing portions 112 and weighting portion 132 can be moved in the sealed body 100$a$.

(Operation of the Angular Rate Sensor 100)

The principle of detecting angular velocity using the angular rate sensor 100 is described. As described above, the mutually corresponding driving electrodes 115, 146 and detecting electrodes 116, 147 are arranged between the first structure 110 and the first substrate 140. Also, the mutually corresponding driving electrodes 135, 156 are provided between the second structure 130 and the second substrate 150.

(1) Vibration of the Displacing Portions 12

When a voltage is applied between the driving electrodes 115, 146, these driving electrodes 115, 146 are attracted to each other by the Coulomb force, and the displacing portions 112 (also the weighting portions 132) are displaced in the positive Z-axis direction. Also, when a voltage is applied between the driving electrodes 135, 156, these electrodes 135, 156 are attracted to each other by the Coulomb force, and the displacing portions 112 (also the weighting portions 132) are displaced in the negative Z-axis direction. Namely, alternating application of the voltage between the driving electrodes 115, 146 and between the driving electrodes 135, 156 causes the displacing portions 112 (also the weighting portions 132) to vibrate in both the Z-axis directions. For the application of voltage, a positive or negative direct-current wave form (a pulse wave form if including non-applied periods as well), a half-wave form or the like can be used.

The cycle of vibration of the displacing portions 112 depends on the cycle of switching the voltage. This switching cycle preferably approximates in some extent the natural frequency of the displacing portions 112. The natural frequency of the displacing portions 112 depends on the elasticity of the connecting portions 113 and the mass of the weighting portions 132 and the like. If the cycle of vibration applied to the displacing portions 112 is not corresponding to the natural frequency, the vibrational energy to be applied to the displacing portions 112 will diverge, thus lowering the energy efficiency.

(2) Generation of the Coriolis Force Due to Angular Velocity

When angular velocity $\omega$ is applied to the weighting portions 132 (displacing portions 112) while the weighting portions 132 and the displacing portions 112 are moving at a velocity of vz in the Z-axis direction, Coriolis force F works on these weighting portions 132. Specifically, corresponding to angular velocity $\omega x$ in the X-axis direction and angular velocity $\omega y$ in the Y-axis direction, Coriolis force Fy ($=2 \times m \times vz \times \omega x$) in the Y-axis direction and Coriolis force Fx ($=2 \times m \times vz \times \omega y$) in the X-axis direction will work on the weighting portions 132, respectively (m is the mass of the weighting portions 132).

Figure 10:
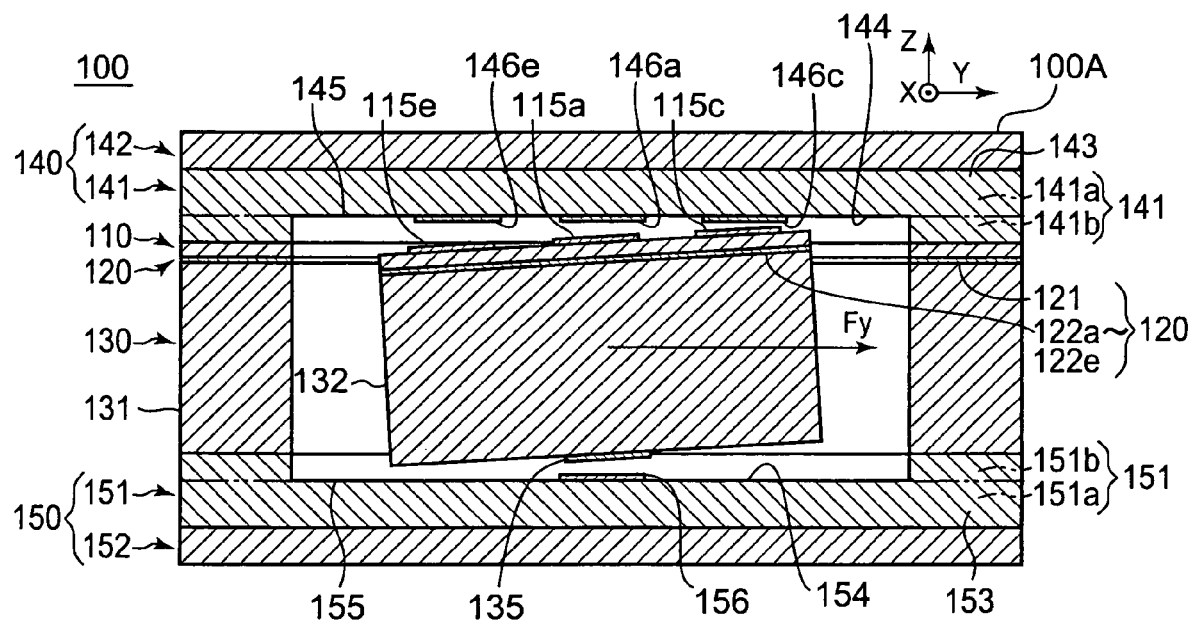
FIG. 10 is a cross section showing a state of the angular rate sensor when Coriolis force Fy due to angular rate ωx in the X-axis direction is applied to the sensor.

FIG. 10, correspondingly to FIG. 7, illustrates a cross section representing a state of the angular rate sensor 100 when the Coriolis force Fy (Fy=$2 \times m \times vz \times \omega x$) due to angular velocity $\omega x$ in the X-axis direction is applied to the sensor.

It is found that an inclination in the Y direction occurs of the displacing portions 112 by the effect of the Coriolis force Fy. In such a manner, inclinations (displacements) in the X and Y directions of the displacing portions 112 will occur by the Coriolis force Fy, Fx due to angular velocities $\omega x$, $\omega y$.

(3) Detection of the Inclination of the Displacing Portions 112

The inclination of the displacing portions 112 can be detected by the detecting electrodes 116, 147. When the Coriolis force Fy in the positive Y-axis direction is applied to the displacing portions 112, the distance between the detecting electrodes 116c, 147c will decrease, while the distance between the detecting electrodes 116e and 147e will increase. As a result, the capacitance between the detecting electrodes 116c and 147c becomes large, while the capacitance between the detecting electrodes 116e and 147e becomes small. Namely, based on the difference between the capacitance values obtained between the respective detecting electrodes 116b to 116e and 147b to 147e, changes in the inclinations of the displacing portions 112 in the X-axis and Y-axis directions are detected, and then obtained as detected signals.

As described above, the displacing portions 112 are vibrated in the Z-axis direction by means of the driving electrodes 115, 146 as well as the driving electrodes 135, 156, and the inclinations of the displacing portions 112 in the X-axis and Y-axis directions are detected by means of the detecting electrodes 116, 147 (the driving electrodes 115, 146 as well as the driving electrodes 135, 156 serve as vibration imparting portions, while the detecting electrodes 116, 147 serve as displacement detecting portions). As a result, it becomes possible to perform measurement of the angular velocities $\omega y$, $\omega x$ in the X-axis and Y-axis (two-axes) directions using the angular rate sensor 100.

(4) Removal of Bias Components From the Detected Signals

The signals outputted from the detecting electrodes 116, 147 include components other than those resulting from the angular velocities $\omega y$, $\omega x$ to be applied to the weighting portions 132. The signals also include components resulting from accelerations $\alpha x$, $\alpha y$ in the X-axis and Y-axis directions to be applied to the weighting portions 132. The displacement of the displacing portions 112 is also generated due to the effect of these accelerations $\alpha x$, $\alpha y$.

To obtain the component of the angular velocity from the detected signal while removing the component of the acceleration, the difference of characters of these components can be utilized. Namely, force F$\omega$ ($=2 \times m \times vz \times \omega$) to be generated when angular velocity ($\omega$) is applied to the weighting portions 132 (mass=m) depends on the velocity vz in the Z-axis direction of the weighting portions 132. On the other hand, force F$\alpha$ to be generated when acceleration ($\alpha$) is applied to the weighting portions 132 (mass=m) does not depend on the vibration of the weighting portions 132. That is, the component of the angular velocity in the detected signal is one type of amplitude components to be changed periodically corresponding to the vibration of the displacing portions 112, while the component of the acceleration in the detected signal is one type of bias components which is not corresponding to the vibration of the displacing portions 112.

By removing the bias components from the detected signal, extraction of the angular velocity component from the detected signal, i.e., measurement of the angular velocity can be performed. For example, by the frequency analysis of the detected signal, a vibrational component similar to the frequency of the displacing portions 112 can be extracted.

(Production of the Angular Rate Sensor 100)

The steps of producing the angular rate sensor 100 will be described below.

Figure 11:
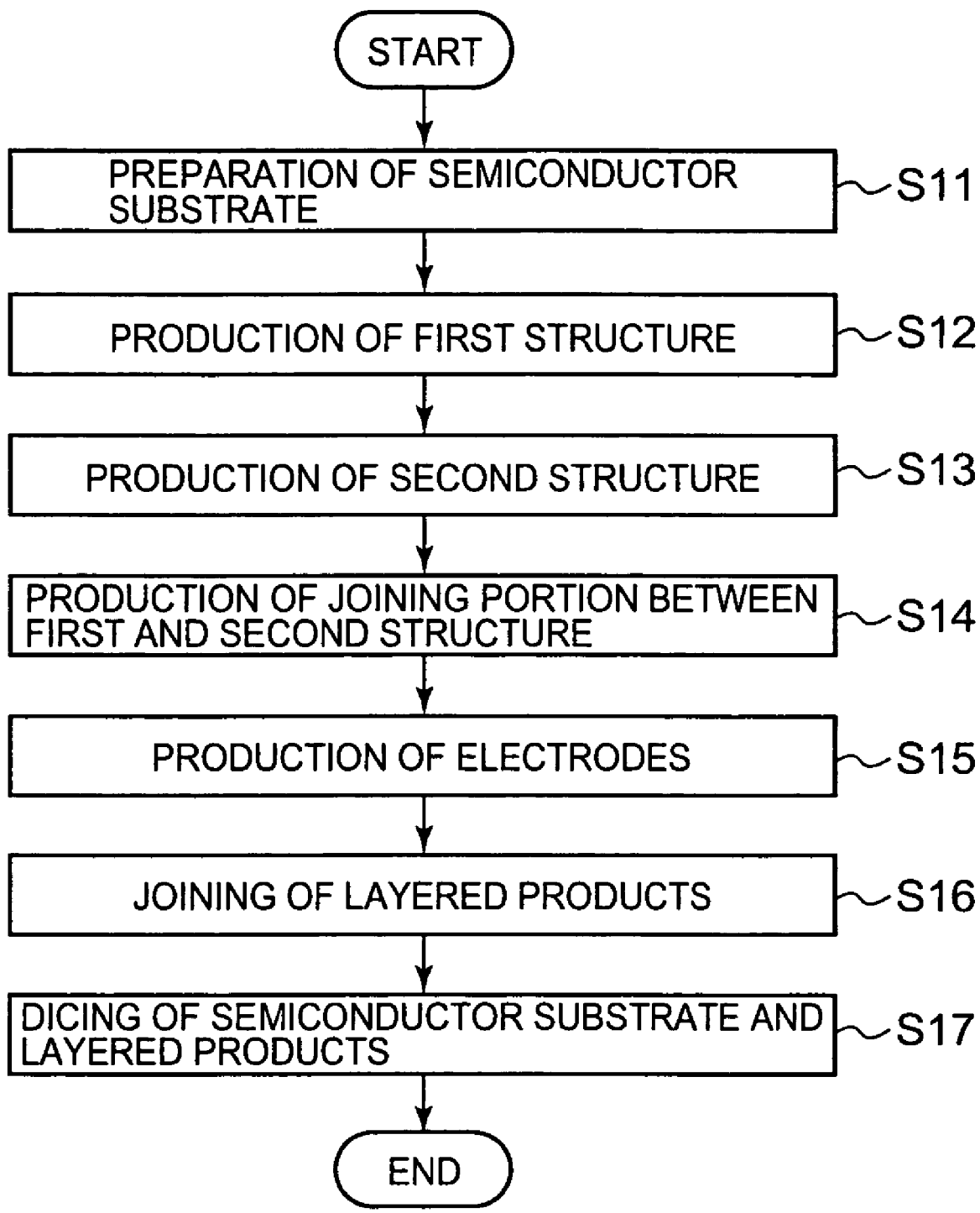
FIG. 11 is a flow chart showing one example of a procedure of producing an angular rate sensor.

FIG. 11 is a flow chart showing one example of a procedure for producing the angular rate sensor 100. FIGS. 12 to 20, correspondingly to FIG. 7, illustrate cross sections each depicting a state of the angular rate sensor 100 in the production procedure of FIG. 11 (each corresponding to a cross section of the angular rate sensor 100 taken along line A1-A2 of FIG. 1).

Figure 12:
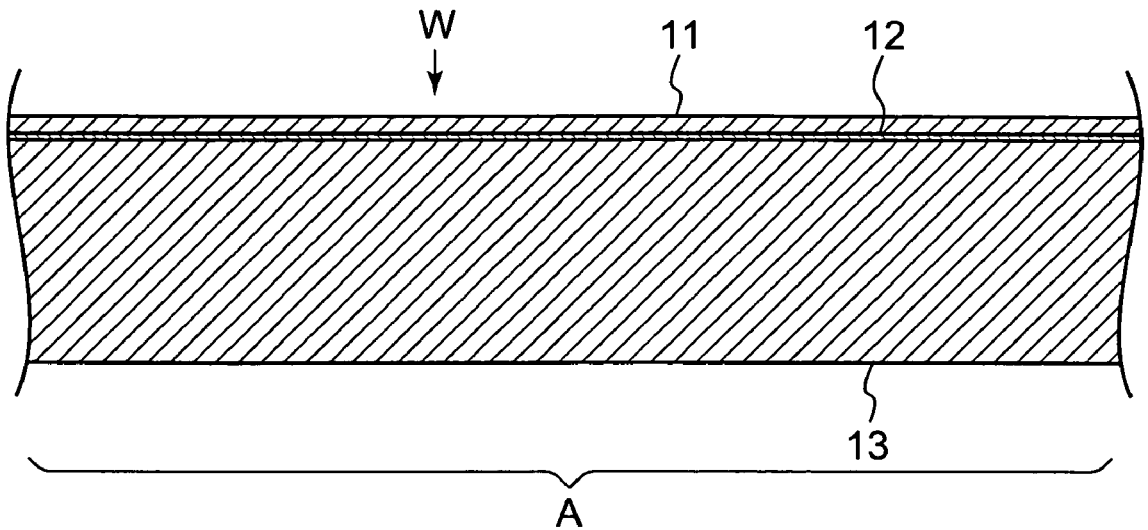
FIG. 12 is a cross section showing a state of the angular rate sensor in the production procedure of FIG. 11.
Figure 21:
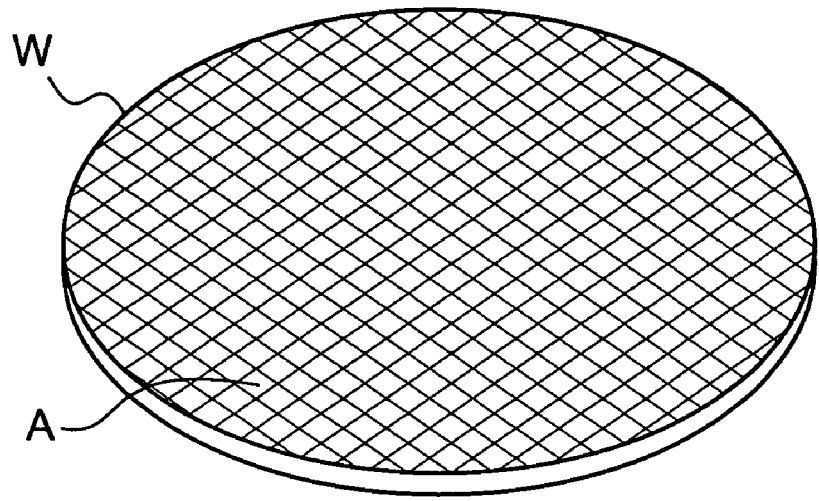
FIG. 21 is a perspective view showing a semiconductor substrate.

(1) Preparation of the Semiconductor Substrate W (Step S11, and FIGS. 12 and 21)

As shown in FIG. 12, three layers, first, second, and third layers 11, 12, 13 are laminated with one another to prepare a semiconductor substrate W.

FIG. 21 is a schematic diagram of the semiconductor wafer W. In the drawing, the depiction of the first, second, and third layers 11, 12, 13 is omitted. As shown in the drawing, the semiconductor substrate W is divided into a plurality of regions A, each of which can produce the angular rate sensor 100. Namely, the angular rate sensors 100 are produced collectively in large numbers (for example, several thousands or several tens of thousands) on a sheet of semiconductor substrate W.

In FIG. 12, one of the regions A shown in FIG. 21 is depicted, and this is also the case to the other FIGS. 13 to 20.

The first, second, and third layers 11, 12, 13 are employed for constructing the first structure 100, joining portion 120, and second structure 130, consisting of silicon, silicon oxide, and silicon, respectively.

The semiconductor substrate W having such a three-laminated (three-layered) silicon/silicon oxide/silicon structure can be formed by laminating a silicon oxide film and then a silicon film onto a silicon substrate (the so-called SOI substrate).

The purpose of forming the second layer 12 with a different material from that of the first and third layers 11, 13 is to provide different etching properties to the second layer 12 from those of the first and third layers 11, 13, thereby to utilize the second layer 12 as an etching stopper layer. Namely, the second layer 12 serves as a stopper layer in both etching processes wherein the first layer 11 is etched from its top face and the third layer 13 is etched from its bottom face.

While in this example the first layer 11 and the third layer 13 are formed from the same material (silicon), all the first, second, and third layers 11, 12, 13 may be formed from individually different materials.

Figure 13:
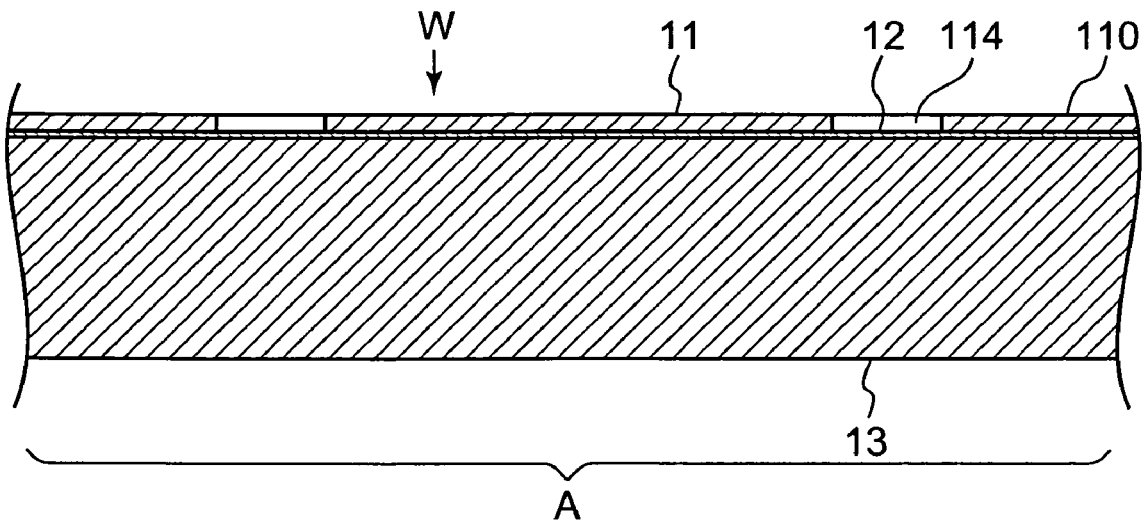
FIG. 13 is a cross section showing another state of the angular rate sensor in the production procedure of FIG. 11.

(2) Production of the First Structure 110 (Etching of the First Layer 10, Step S12, and FIG. 13)

By etching the first layer 11, openings 114 are formed to construct the first structure 110. That is, using an etching process which is erosive to the first layer 11 but not erosive to the second layer 12, predetermined regions (openings 114a to 114d) of the first layer 11 are etched in the thickness direction until the top face of the second layer 12 is exposed.

In this case, a resist layer having a pattern corresponding to the first structure 100 is formed on the top face of the first layer 11, followed by vertically downward erosion in the exposed regions uncoated with the resist layer. In this etching process, since the second layer 12 is not eroded, only the predetermined regions 114 (openings 114a to 114d) of the first layer 11 are removed.

FIG. 13 shows a state where the first structure 110 is formed by providing the etching process as described above to the first layer 11.

Figure 14:
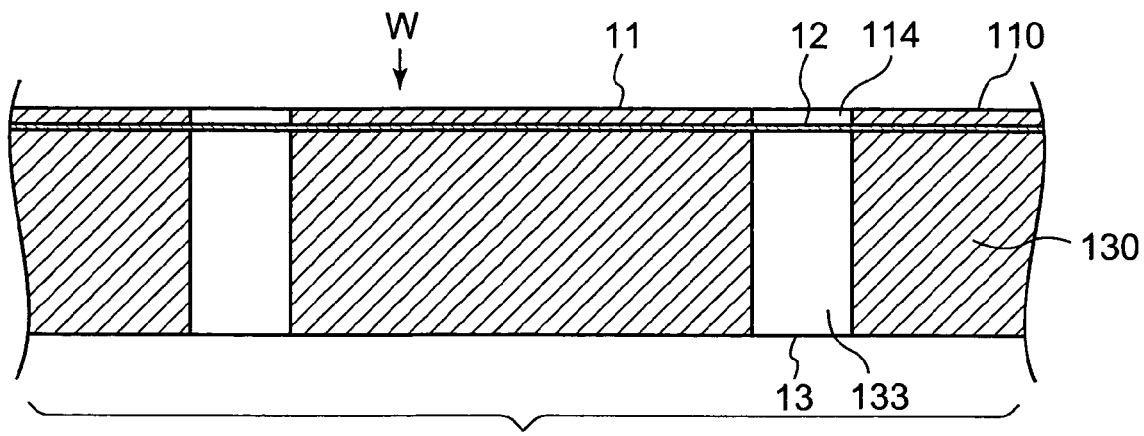
FIG. 14 is a cross section showing another state of the angular rate sensor in the production procedure of FIG. 11.

(3) Production of the Second Structure 130 (Etching of the Third Layer 13, Step S13, and FIG. 14)

By etching the third layer 13, openings 133 are formed to construct the second structure 130. That is, using an etching process which is erosive to the third layer 13 but not erosive to the second layer 12, predetermined regions (openings 133) of the third layer 13 are etched in the thickness direction until the bottom face of the second layer 12 is exposed.

In this case, a resist layer having a pattern corresponding to the second structure 130 is formed on the bottom face of the third layer 13, followed by vertically upward erosion in the exposed regions uncoated with the resist layer. In this etching process, since the second layer 12 is not eroded, only the predetermined regions (openings 133) of the third layer 13 are removed.

FIG. 14 shows a state where the second structure 130 is formed by providing the etching process as described above to the third layer 13.

It is noted that the order of the etching process provided to the first layer 11 (Step S12) and the etching process provided to the third layer 13 (Step S13) may be changed alternately. Otherwise, either of the etching processes may be performed first, or both of the processes may be done simultaneously.

Figure 15:
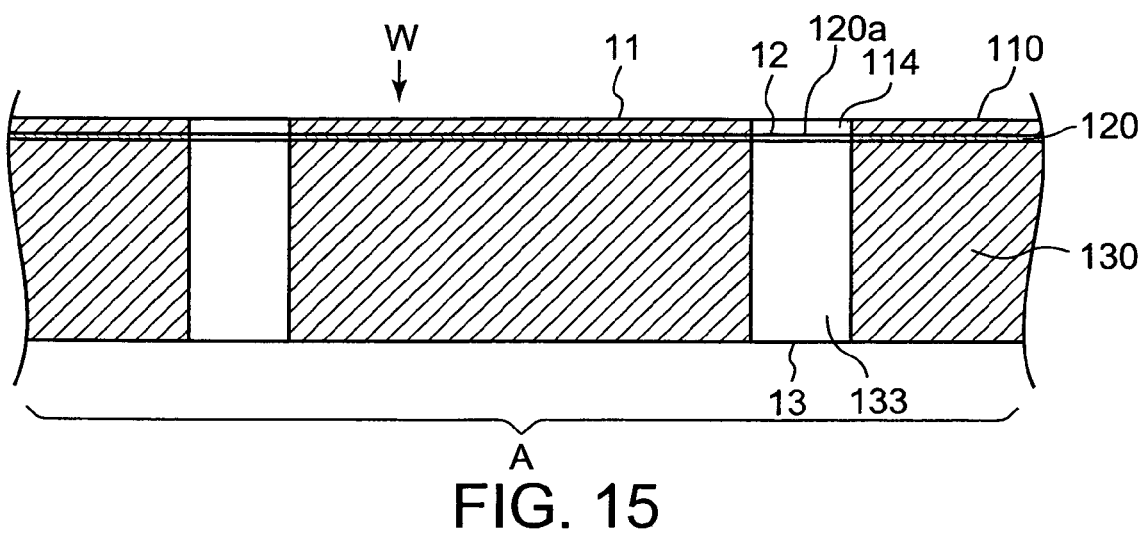
FIG. 15 is a cross section showing still another state of the angular rate sensor in the production procedure of FIG. 11.

(4) Production of the Joining Portion 120 Between the First and Second Structures 110, 130 (Etching of the Second Layer 12, Step S14, and FIG. 15)

By etching the second layer 12, openings 120a are formed to construct the joining portion 120. That is, using an etching process which is erosive to the second layer 12 but not erosive to the first layer 11 and the third layer 13, only the exposed portions of the second layer 12 are etched both in the thickness and layer directions.

In this etching process, there is no need to form a resist layer. Namely, the second structure 130, the remaining portion of the third layer 13, serves as a resist layer for the second layer 12. This etching process is applied to the exposed portions of the second layer 12, i.e., the regions where the openings 133 are formed.

In the production procedure described above, the steps of forming the first structure 110 (Step S12) and the step of forming the second structure 130 (Step S13) should satisfy the following two conditions.

The first condition is to have directionality along the thickness direction of each layer. The second condition is ability to perform etching that is erosive to the silicon layers but not erosive to the silicon oxide layer. The first condition is necessary for forming openings and grooves having predetermined sizes, while the second condition is necessary for utilizing the second layer 12 formed from silicon oxide as an etching stopper layer.

As the etching method satisfying the first condition, the Induced Coupling Plasma Etching Method (ICP) can be used. This etching method is effective for forming deep grooves in the vertical direction, and is one type of the etching methods commonly referred to as the Deep Reactive Ion Etching (DRIE).

In this method, an etching step for erosively digging a material layer in the thickness direction and a deposition step for forming a polymer wall over the side face of each of the so formed holes are repeated alternately. In such a way, since the side face of each of the holes is provided with and protected by such a polymer wall successively, erosion only in the thickness direction can be progressed.

In order to perform the etching satisfying the second condition, an etching material having the etching selectivity between the silicon oxide and silicon can be used. For example, a mixed gas of the SF gas and $O_2$ gas in this etching step, while the $C_4F_8$ gas may be used in the deposition step.

In the etching step applied to the second layer 12 (Step 14), the etching method should meet the following two conditions. The first condition is to have directionalities both in the thickness direction and the layer direction. The second condition is ability to perform etching that is erosive to the silicon oxide layer but not erosive to the silicon layers.

The first condition is necessary for preventing from the degree of freedom in the displacement of the weighting portions 132 to be restricted by the silicon oxide layer remaining at unnecessary regions. The second condition is necessary for preventing the erosive effect to work on the first structure 110 and the second structure 130 formed from silicon, because the predetermined shapes in these structures 110, 130 have been already completed.

As the etching method satisfying both the first and second conditions, a wet etching method utilizing a buffered hydrofluoric acid (a mixed solution of $HF:NH_4F=1:10$) as an etching solution can be used. Also, a dry etching method according to the RIE method utilizing a mixed gas of $CF_4$ gas and $O_2$ gas is applicable.

Figure 16:
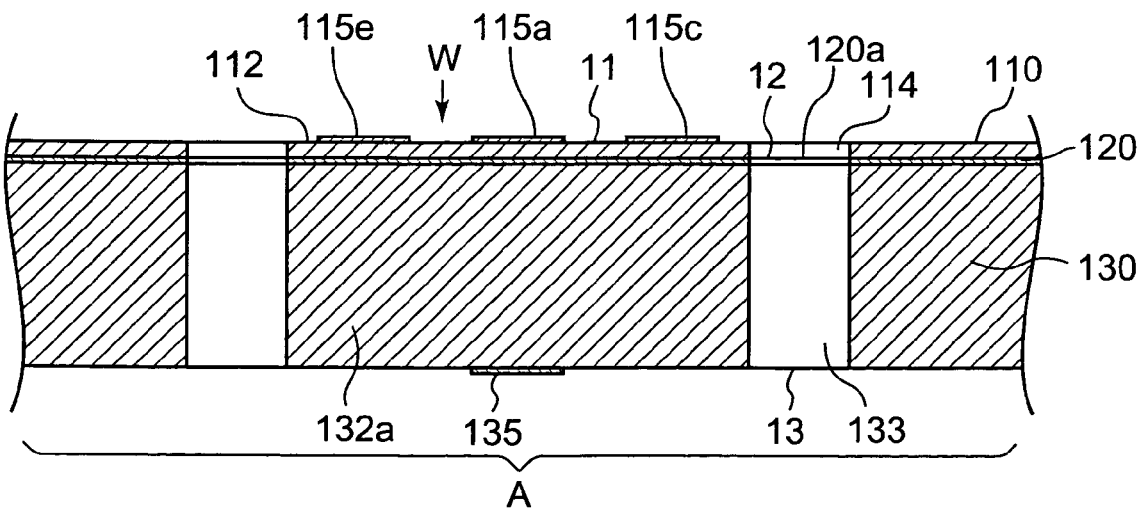
FIG. 16 is a cross section showing another state of the angular rate sensor in the production procedure of FIG. 11.

(5) Formation of the Electrodes (Step S16, and FIG. 16)

The driving electrodes 115 and the detecting electrodes 116 are formed on the displacing portions 112, and the driving electrode 135 is formed on the rear face of the weighting portion 132a. The formation can be achieved by film-forming of an electrode material (e.g., copper) and patterning (an etching process using a mask).

Figure 17:
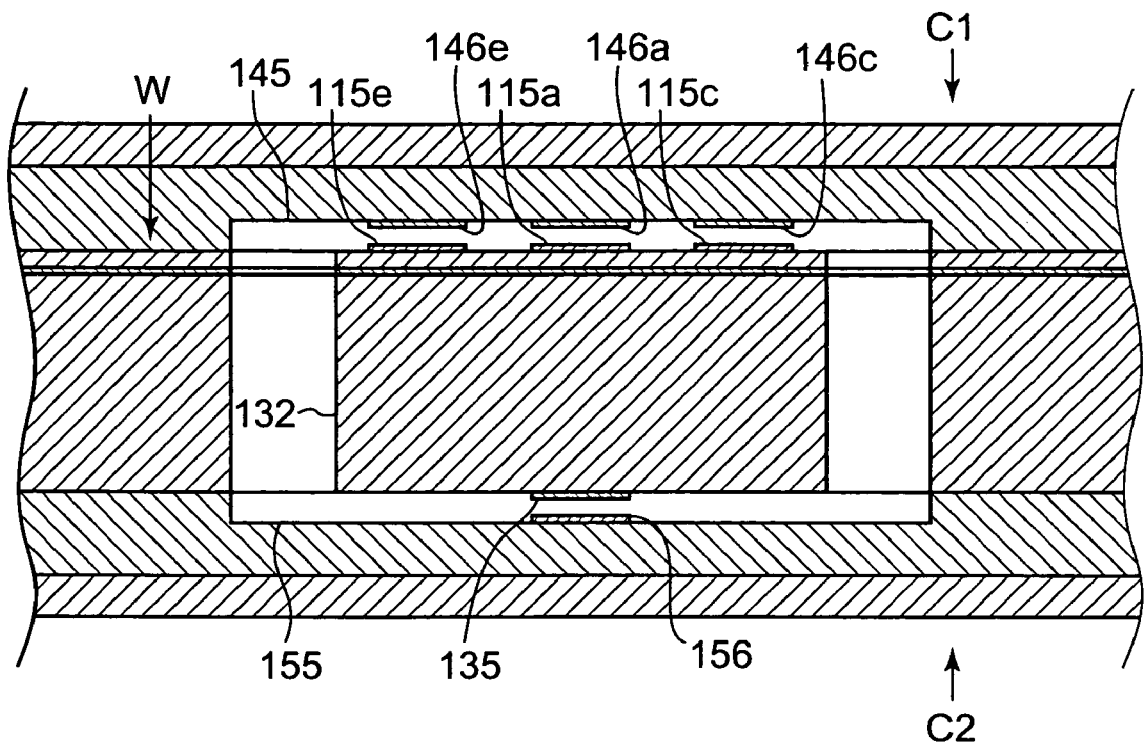
FIG. 17 is a cross section showing yet another state of the angular rate sensor in the production procedure of FIG. 11.

(6) Joining of Layered Products C1, C2 in Which the First and Second Substrates 140, 150 are Formed (Step S17, and FIG. 17)

1) Forming of the First and Second Substrates 140, 150 in Layered Products C1, C2

As layered products C1, C2, three-layered materials composed respectively of the first metal substrates 142, 152, resin substrates 141a, 151a, and second metal substrates 141b, 151b can be used.

The first substrate 140 can be formed by two-step etching of the second metal substrate 141b of the three-layered material to form the recess 145, driving electrodes 146 and detecting electrodes 147. The second substrate 150 can be formed by two-step etching of the second metal substrate 151b of the three layered material to form the recess 155 and driving electrode 156.

As mentioned above, the driving electrodes 146 and detecting electrodes 147 may be formed by etching the second metal substrate 141b without forming the recess 145.

Also in the layered products C1, C2 are formed throughholes through which electrical connections from the outside can be provided to the terminals 148, 149, 158 of the electrodes 146, 147, 156.

In this stage (before a dicing process described below), the first and second substrates 140, 150 are formed on the layered products C1, C2, respectively, in large numbers, and not yet separated into individual substrates 140, 150.

2) Joining the First Substrate 140 to the First Structure 110, and the Second Substrate 150 to the Second Structure 130

The first structure 110 and the first substrate 140, and the second structure 130 and the second substrate 150 are joined together, respectively.

In this case, an adhesive or alloy can be utilized. For example, joining by using an alloy is carried out as follows. While the joining of the first substrate 140 to the first structure 110, and the second substrate 150 to the second structure 130 are commonly carried out successively, the two joining operations are described together because these substrates and structures can be joined in the same manner, respectively.

Formation of Metal Films on the Bottom Face of the Substrate 140 and on the Top Face of the Substrate 150

Films of a first metal (for example, tin) are formed on the bottom face of the substrate 140 and on the top face of the substrate 150.

Formation of Metal Firms on the Top Face of the First Structure 110 and on the Bottom Face of the Second Structure 130 (Metallization)

Films of a second metal (for example, gold) are formed on the top face of the first structure 110 and on the bottom face of the second structure 130, the second metal being capable of creating an alloy with the first metal. In this case, prior to forming a gold film on the top face of the first structure 110 and on the bottom face of the second structure 130, a film of, for example, Ni, Ti or Cr is formed as a barrier layer.

Joining of the First Substrate 140 to the First Structure 110 and the Second Substrate 150 to the Second Structure 130

Contacting the tin layer on the bottom face of first substrate 140 to the gold layer on the top face of first structure 110 while contacting the tin layer on the top face of second substrate 150 to the gold layer on the bottom face of second structure 130, respectively, these contacted materials are heated at 200 to 250° C. As a result, alloying of the gold and tin layers occurs to form a gold-tin alloyed layer, thus joining the first substrate 140 to the first structure 110 and the second substrate 150 to the second structure 130.

(7) Dicing of the Semiconductor Substrate W (Step S17, and FIGS. 18 to 20, and 22)

1) Connection to a Dicing Pad 21

A dicing pad is connected to the bottom face of the layered product C2. The dicing pad 21 is an adhesive film adapted to fix the angular rate sensors 100 when the sensors 100 are cut by dicing from the semiconductor substrate W and layered products C1, C2. On a surface of the dicing pad 21, an adhesive material is coated, the adhesion properties of which material will be lowered by irradiation of ultraviolet rays.

Figure 22:
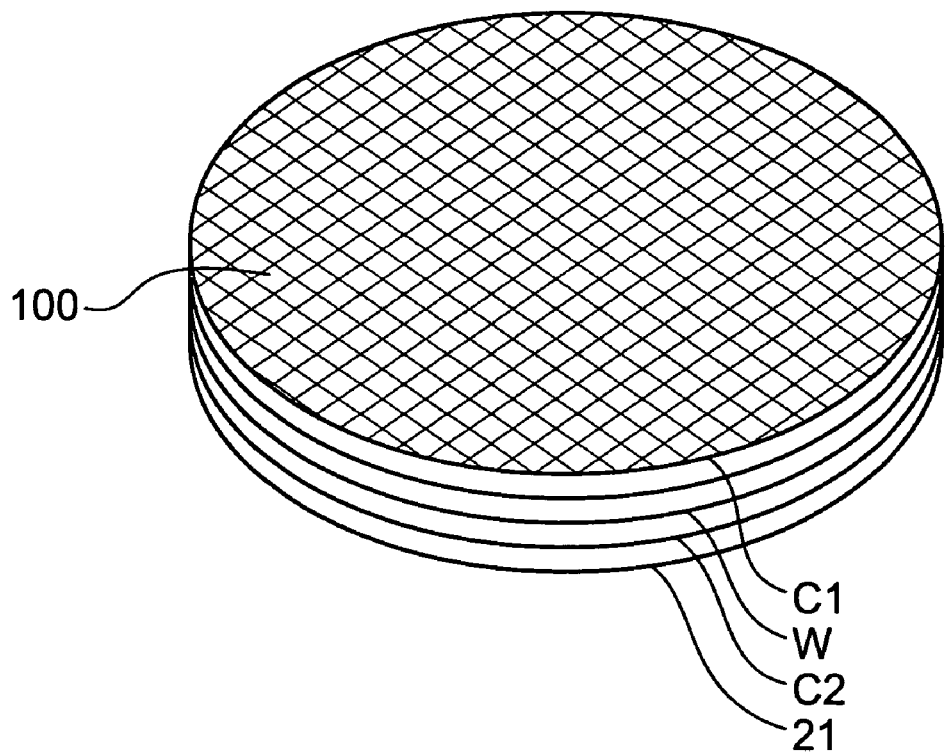
FIG. 22 is a perspective view showing a state where a dicing pad is attached to a bottom face of the semiconductor substrate and laminated products.

FIG. 22 is a schematic diagram showing a state where the dicing pad 21 is connected to the semiconductor substrate W and layered products C1, C2, in which the angular rate sensors 100 are formed in large numbers.

2) Formations of Notches

Figure 18:
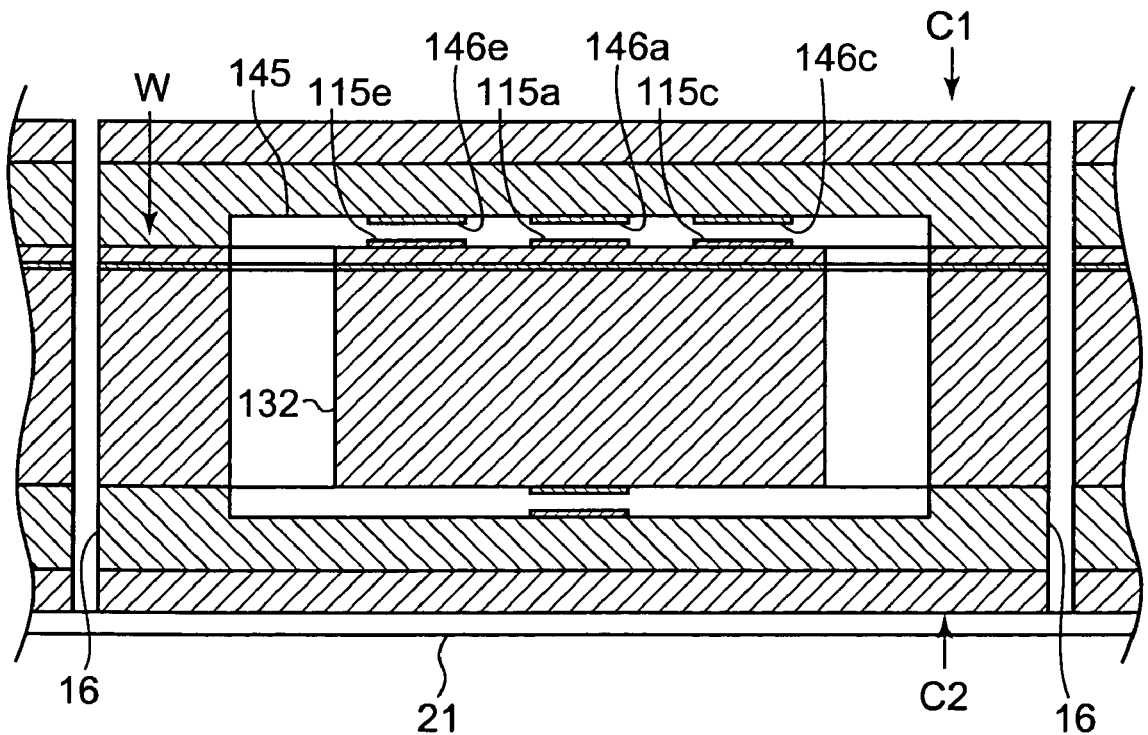
FIG. 18 is a cross section showing another state of the angular rate sensor in the production procedure of FIG. 11.

Notches are formed by cutting the semiconductor substrate W and layered products C1, C2 using a dicing saw or the like. In this case, a coolant is used for reducing the heating of the cut positions (FIG. 18).

3) Removal of the Angular Rate Sensors 100

Figure 19:
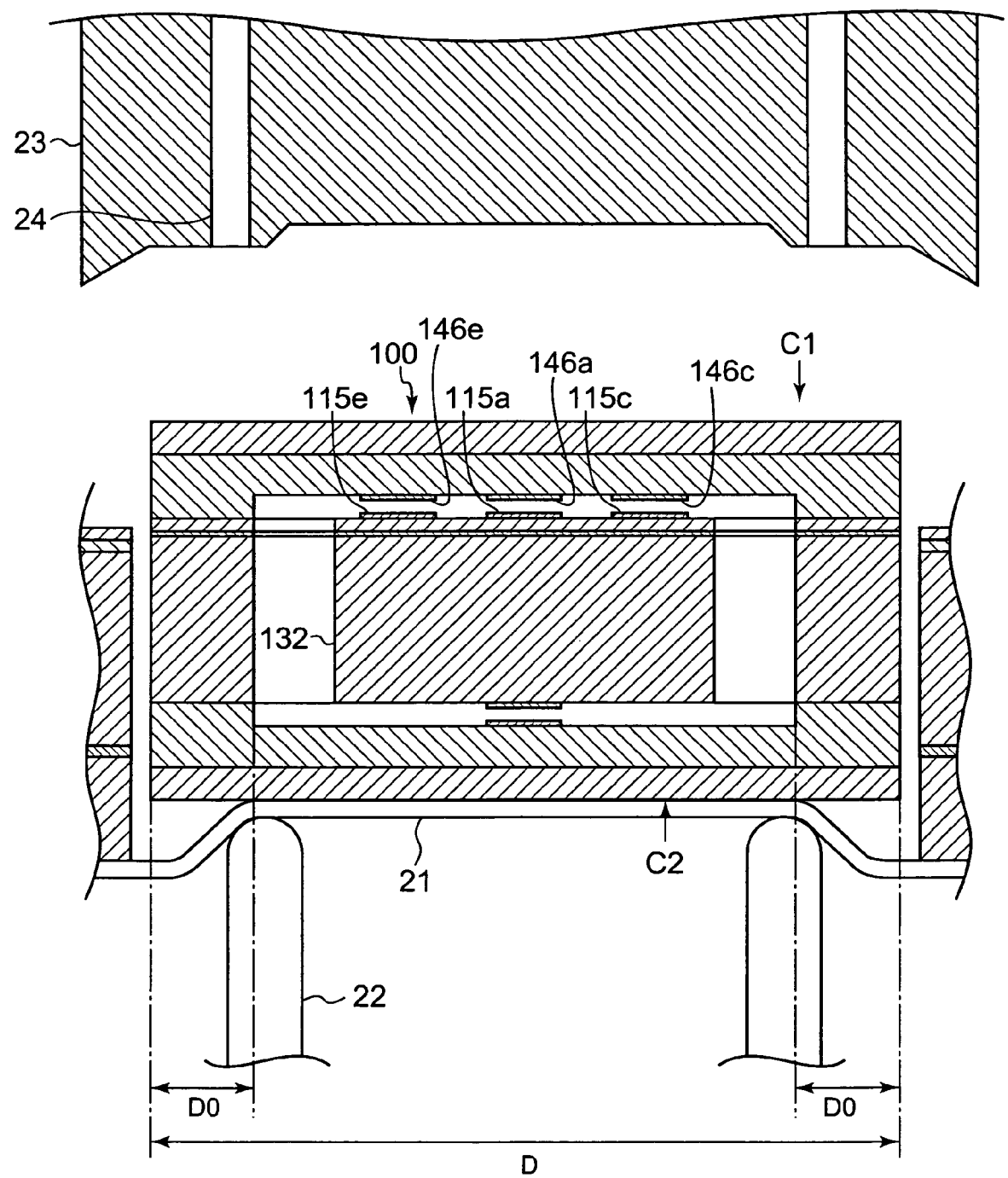
FIG. 19 is a cross section showing still another state of the angular rate sensor in the production procedure of FIG. 11.
Figure 20:
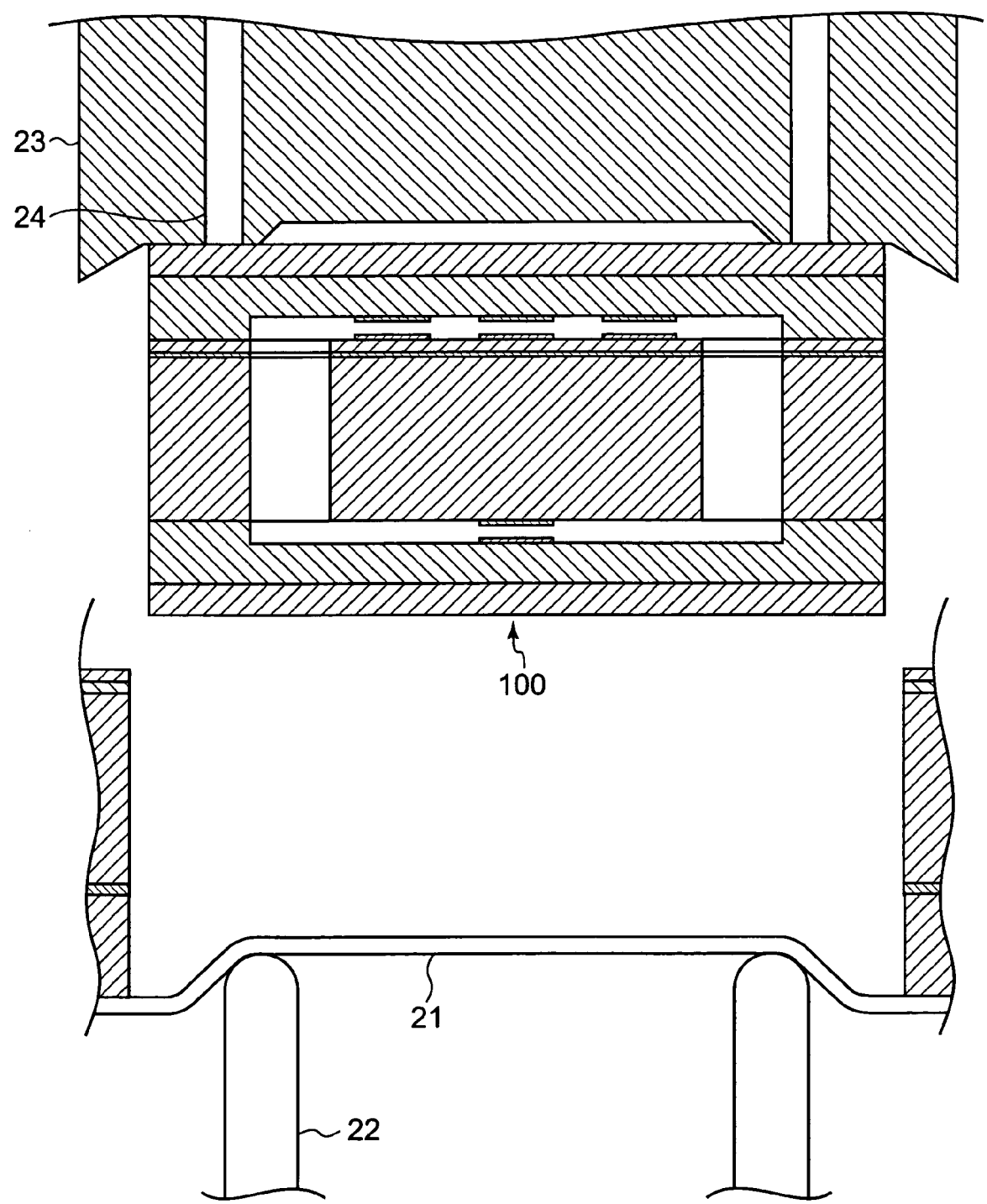
FIG. 20 is a cross section showing yet another state of the angular rate sensor in the production procedure of FIG. 11.

With the bottom face of the second substrate 150 being pushed by projecting pins 22 and each angular rate sensor 100 being lifted from the substrate W, the angular rate sensor 100 is sucked by a sucking mouth 24 of a vacuum chuck 23 (FIG. 19, 20). At that time, by irradiation of ultraviolet (UV) rays to the adhesive material of the dicing pad 21, the adhesion properties is lowered, thereby providing easy separation of the angular rate sensor 100 from the dicing pad 21.

The projecting pins 22 can push any positions of the bottom face (the width D in FIG. 19) of the substrate 150. The second substrate 150 is formed of a layered product composed of a resin and a metal and thus has a sufficient strength. Accordingly, the angular rate sensor 100 is not broken by the pushing force due to the projecting pins 22.

If the angular rate sensor 100 were removed in a state where the second substrate 150 is not connected thereto, the area that the projecting pins 22 could push is limited to the area of the pedestal portion 131 (the width DO in FIG. 19), thus requiring quite minute control of the projecting pins 22. Namely, should the projecting pins 22 push directly the weighting portions 132, the connecting portions 113 would be broken.

In addition, should the substrates 140, 150 be formed from a glass material, it would be difficult to make the substrates 140, 150 relatively thin, and therefore production of a thinner angular rate sensor 100 would be quite difficult.

According to the present invention, by using layered materials composed of a resin and a material for forming the first and second substrates 140, 150, the reliability of sealing the angular rate sensor 100 can be assured, and production of a significantly thinner angular rate sensor 100 and enhancement of its productivity can be accomplished.

OTHER EMBODIMENTS

The embodiments of the present invention are not limited to those described above, and further extensions and modifications can be made. It should be construed that such extended and modified embodiments fall in the technical scope of the present invention.

The invention claimed is:

1. An angular rate sensor comprising:
a first structure which includes a fixed portion having an opening, a displacing portion placed in the opening and configured to be displaced relative to the fixed portion, and a connecting portion adapted to connect the fixed portion and the displacing portion, and is formed of a substrate composed of a first semiconductor material;
a second structure which includes a weighting portion respectively joined to the displacing portion, and a pedestal portion arranged to surround the weighting portion and joined to the fixed portion, and is laminated in place on the first structure and composed of a second semiconductor material;
a first substrate laminated on the first structure;

a second substrate laminated on the second structure;

a vibration imparting portion adapted to impart vibration to the displacing portion of the first structure; and a displacement detecting portion adapted to detect displacement of the displacing portion; wherein:

the first substrate, the fixed portion, the pedestal portion, and the second substrate form a sealed body together such that the displacing portion and the weighting portion can be moved in the sealed body;

the first substrate includes a first metal layer and a first insulating layer laminated on the first metal layer, the first insulating layer including a first recess, and being connected to the fixed portion; and the second substrate includes a second metal layer and a second insulating layer laminated on the second metal layer, the second insulating layer including a second recess, and being connected to the pedestal portion.

2. The angular rate sensor according to claim 1, wherein each of the first insulating layer of the first substrate and the second insulating layer of the second substrate is composed of a material capable of being etched.

3. The angular rate sensor according to claim 1, wherein either of the first insulating layer of the first substrate or the second insulating layer of the second substrate has a third metal layer formed thereon.

4. The angular rate sensor according to claim 3, wherein the vibration imparting portion is formed of the third metal layer.

5. The angular rate sensor according to claim 3, wherein the displacement detecting portion is formed of the third metal layer.

6. The angular rate sensor according to claim 1, wherein each of the first semiconductor material of the first structure and the second semiconductor material of the second structure is formed from silicon.

7. The angular rate sensor according to claim 1, wherein a joining portion is provided between the first structure and the second structure.

8. The angular rate sensor according to claim 7, wherein each of the first semiconductor material of the first structure and the second semiconductor material of the second structure is formed from silicon while the joining portion is formed from silicon oxide.

* * * * *